(12) United States Patent
Nakagawa et al.

(10) Patent No.: US 10,726,554 B2
(45) Date of Patent: Jul. 28, 2020

(54) INFORMATION PROCESSING APPARATUS, INFORMATION PROCESSING SYSTEM, AND INFORMATION PROCESSING METHOD

(71) Applicant: Sony Corporation, Tokyo (JP)

(72) Inventors: Kazuhiro Nakagawa, Saitama (JP); Ikuko Tsurui, Kanagawa (JP); Hatsume Uno, Tokyo (JP)

(73) Assignee: Sony Corporation, Tokyo (JP)

( * ) Notice: Subject to any disclaimer, the term of this patent is extended or adjusted under 35 U.S.C. 154(b) by 196 days.

(21) Appl. No.: 15/738,862

(22) PCT Filed: May 20, 2016

(86) PCT No.: PCT/JP2016/002472
§ 371 (c)(1),
(2) Date: Dec. 21, 2017

(87) PCT Pub. No.: WO2017/002300
PCT Pub. Date: Jan. 5, 2017

(65) Prior Publication Data
US 2018/0174295 A1 Jun. 21, 2018

(30) Foreign Application Priority Data

Jun. 30, 2015 (JP) ................................. 2015-131448
Feb. 24, 2016 (JP) ................................. 2016-033139

(51) Int. Cl.
*G06K 9/00* (2006.01)
*G06T 7/00* (2017.01)
*G06T 7/246* (2017.01)

(52) U.S. Cl.
CPC ............ *G06T 7/0016* (2013.01); *G06T 7/248* (2017.01); *G06T 2207/30024* (2013.01)

(58) Field of Classification Search
None
See application file for complete search history.

(56) References Cited

U.S. PATENT DOCUMENTS 6,416,959 B1 * 7/2002 Giuliano ................. C12Q 1/68
250/201.3
6,615,141 B1 9/2003 Sabry et al.
(Continued)

FOREIGN PATENT DOCUMENTS

| EP | 2 325 326 A1 | 5/2011 |
| JP | 2009-515533 A | 4/2009 |
| JP | 2011-188860 A | 9/2011 |

OTHER PUBLICATIONS

International Search Report and Written Opinion dated Aug. 12, 2016 in connection with International Application No. PCT/JP2016/002472.

(Continued)

*Primary Examiner* — Shervin K Nakhjavan
(74) *Attorney, Agent, or Firm* — Wolf, Greenfield & Sacks, P.C.

(57) ABSTRACT

According to some aspects, an image processing apparatus is provided. The image processing apparatus includes circuitry configured to receive at least two images of at least one cell. The at least two images are captured at different times. The circuitry is further configured to determine a motion amount of at least one intracellular structure identified within the at least one cell by comparing the at least two images and generate an indication of cell metabolism information associated with the at least one cell by relating at least one parameter of the motion amount to a degree of cell metabolism for the at least one cell based on reference information.

31 Claims, 16 Drawing Sheets

(56) References Cited

U.S. PATENT DOCUMENTS

| | | | | |
|---|---|---|---|---|
| 8,951,184 B2* | 2/2015 | Wong | ................. | C12Q 1/02 600/33 |
| 9,410,939 B2* | 8/2016 | Zernicka-Goetz | ........................ | G01N 33/5091 |
| 2001/0041347 A1* | 11/2001 | Sammak | ............ | G01N 33/5005 435/7.23 |
| 2002/0119441 A1* | 8/2002 | Elias | .................. | G01N 15/1475 435/4 |
| 2002/0164063 A1 | 11/2002 | Heckman | | |
| 2003/0185450 A1 | 10/2003 | Garakani et al. | | |
| 2003/0215941 A1* | 11/2003 | Campbell | .............. | B82Y 30/00 435/325 |
| 2004/0071328 A1* | 4/2004 | Vaisberg | ............ | G01N 15/1475 382/129 |
| 2004/0236091 A1* | 11/2004 | Chicz | .................... | C07K 14/47 536/23.5 |
| 2008/0247628 A1* | 10/2008 | Ramsing | ............ | G06K 9/00127 382/133 |
| 2009/0274360 A1* | 11/2009 | Suzuki | ............... | G01N 21/6428 382/133 |
| 2010/0135566 A1* | 6/2010 | Joanidopoulos | ..... | G06K 9/0014 382/133 |
| 2013/0162795 A1* | 6/2013 | Wong | ................... | C12N 5/0604 348/77 |
| 2014/0206931 A1 | 7/2014 | Zernicka-Goetz et al. | | |
| 2015/0290333 A1* | 10/2015 | Raghunath | ....... | A61K 47/48092 424/93.7 |

OTHER PUBLICATIONS

Sakaue-Sawano et al., Visualizing Spatiotemporal Dynamics of Multicellular Cell-Cycle Progression, Cell, vol. 132, Feb. 8, 2008, pp. 487-498.

International Preliminary Report on Patentability dated Jan. 11, 2018 in connection with International Application No. PCT/JP2016/002472.

* cited by examiner

Control

Paclitaxel 2 μM
1hr

Paclitaxel 2 μM
1hr

Nocodazole 2 μM
1hr

Nocodazole 2 μM
1hr

INFORMATION PROCESSING APPARATUS, INFORMATION PROCESSING SYSTEM, AND INFORMATION PROCESSING METHOD

CROSS REFERENCE TO RELATED APPLICATIONS

This Application is a national stage entry filed under 35 U.S.C. § 371 of PCT Application Serial No. PCT/JP2016/002472, filed May 20, 2016. PCT Application Serial No. PCT/JP2016/002472 claims priority to Japanese Priority Patent Application JP 2015-131448 filed Jun. 30, 2015, and Japanese Priority Patent Application JP 2016-033139 filed Feb. 24, 2016, the entire contents of which are incorporated herein by reference.

TECHNICAL FIELD

The present technology relates to an information processing apparatus, an information processing system, and an information processing method that are used to analyze cells.

BACKGROUND ART

Production of iPS cells (see Patent Literature 1) leads to a significant progress in the fields of regenerative medicine, cell remedy, tissue engineering, and cell engineering, and there is a greatly increased demand to evaluate statuses of cells or evaluate effects or influences of medicines and the like by using cells. In the fields of regenerative medicine and cell remedy, it is necessary to increase cells so as to produce cells, tissues, and organs. Thus, evaluating and managing a cell cycle is important to produce normal cells, tissues, and organs. In this case, it is assumed that a produced organ or the like is brought back to a human body, and thus a non-destructive, non-invasive, and unstained evaluation technique is demanded. It should be noted that the cell cycle is a cycle of one cell from birth by cell division to cell division.

Further, also in the case where treatment effectiveness of a medicine to a disease by using cells or tissues produced by tissue engineering or cell engineering is examined, it is very important to evaluate a cell cycle, which is an important element to know the status of a cell. In particular, in the case where a cytotoxic activity of anticancer drugs or the like is investigated, the evaluation of the cell cycle is important. Also in those examinations in vitro using cells or tissues, from the perspective of a change over time and an interaction between a medicine and other molecules, a non-destructive, non-invasive, and unstained evaluation technique is demanded.

Additionally, in the case where evaluation on the effects, influences, and treatment of medicines and the like is examined, there is also a demand to evaluate the status of an intracellular metabolism corresponding to the amount of adenosine triphosphate (ATP) or the status of a microtubule as a cytoskeleton. In particular, to evaluate a cytotoxic activity of anticancer drugs or the like, it is important to evaluate the stats of an intracellular metabolism or the status of a cytoskeleton.

As a cell cycle evaluation method, an evaluating method by staining DNA and determining a quantity of DNA by flow cytometry, and flow cytometry or an imaging technique using antibodies against molecules specifically expressed in a cell cycle are widely used. In addition thereto, a redox dye (Cell clock: biocolor) that specifically dyes a cell cycle or a fluorescent protein expression system using proteins that specifically express in a cell cycle (see Non-patent Literature 1) are achieved. As a method of evaluating the stats of an intracellular metabolism or the status of a cytoskeleton, similarly, a technique using fluorescent substance is also generally used. As a technique capable of evaluating a cell cycle in an unstained manner, a technique of imaging a cell over time and grasping nuclear division from the form of a nucleus is proposed (see Patent Literature 2).

CITATION LIST

Patent Literature

PTL 1: Japanese Patent Application Laid-open No. 2011-188860
PTL 2: Japanese Patent Application Laid-open No. 2009-515533

Non Patent Literature

NPL 1: Fucci: Sakaue-Sawano, A., et al., Cell 132, 487-498 (2008)

SUMMARY

Technical Problem

However, the evaluation method using staining as described in Non-patent Literature 1 is difficult to use in the fields of regenerative medicine, cell remedy, and the like. Further, in the technique of grasping nuclear division from the form of a nucleus as described in Patent Literature 2, it is necessary to grasp the nuclear division, that is, an M phase, in order to correctly evaluate a cell cycle.

In view of the circumstances as described above, it is desirable to provide an information processing apparatus, an information processing system, and an information processing method that are capable of evaluating the stats of an intracellular metabolism or the status of a cytoskeleton in a unstained manner and further capable of evaluating a cell cycle without depending on detection of nuclear division.

Solution to Problem

According to an aspect of the present application, an image processing apparatus is provided. The image processing apparatus includes circuitry configured to receive at least two images of at least one cell. The at least two images are captured at different times. The circuitry is further configured to determine a motion amount of at least one intracellular structure identified within the at least one cell by comparing the at least two images and generate an indication of cell metabolism information associated with the at least one cell by relating at least one parameter of the motion amount to a degree of cell metabolism for the at least one cell based on reference information.

According to an aspect of the present application, an image processing method is provided. The image processing method includes receiving at least two images of at least one cell. The at least two images are captured at different times. The image processing method further includes determining a motion amount of at least one intracellular structure identified within the at least one cell by comparing the at least two images and generating an indication of cell metabolism information associated with the at least one cell by relating at least one parameter of the motion amount to a degree of cell metabolism for the at least one cell based on reference information.

According to an aspect of the present application, at least one computer-readable storage medium storing computer-executable instructions that, when executed, perform an image processing method is provided. The image processing method includes receiving at least two images of at least one cell. The at least two images are captured at different times. The image processing method further includes determining a motion amount of at least one intracellular structure identified within the at least one cell by comparing the at least two images. The image processing method further includes generating an indication of cell metabolism information associated with the at least one cell by relating at least one parameter of the motion amount to a degree of cell metabolism for the at least one cell based on reference information.

According to an aspect of the present application, an image processing system is provided. The image processing system includes an image sensor configured to capture at least two images of a cell at different times. The image processing system further includes circuitry configured to receive the at least two images of at least one cell. The circuitry is further configured to determine a motion amount of at least one intracellular structure identified within the at least one cell by comparing the at least two images. The circuitry is further configured to generate an indication of cell metabolism information associated with the at least one cell by relating at least one parameter of the motion amount to a degree of cell metabolism for the at least one cell based on reference information. The image processing system further includes at least one display configured to present, to a user, a visual representation of the indication of cell metabolism information.

DESCRIPTION OF EMBODIMENTS

Description will be given on an information processing system according to an embodiment of the present technology.

Figure 1:
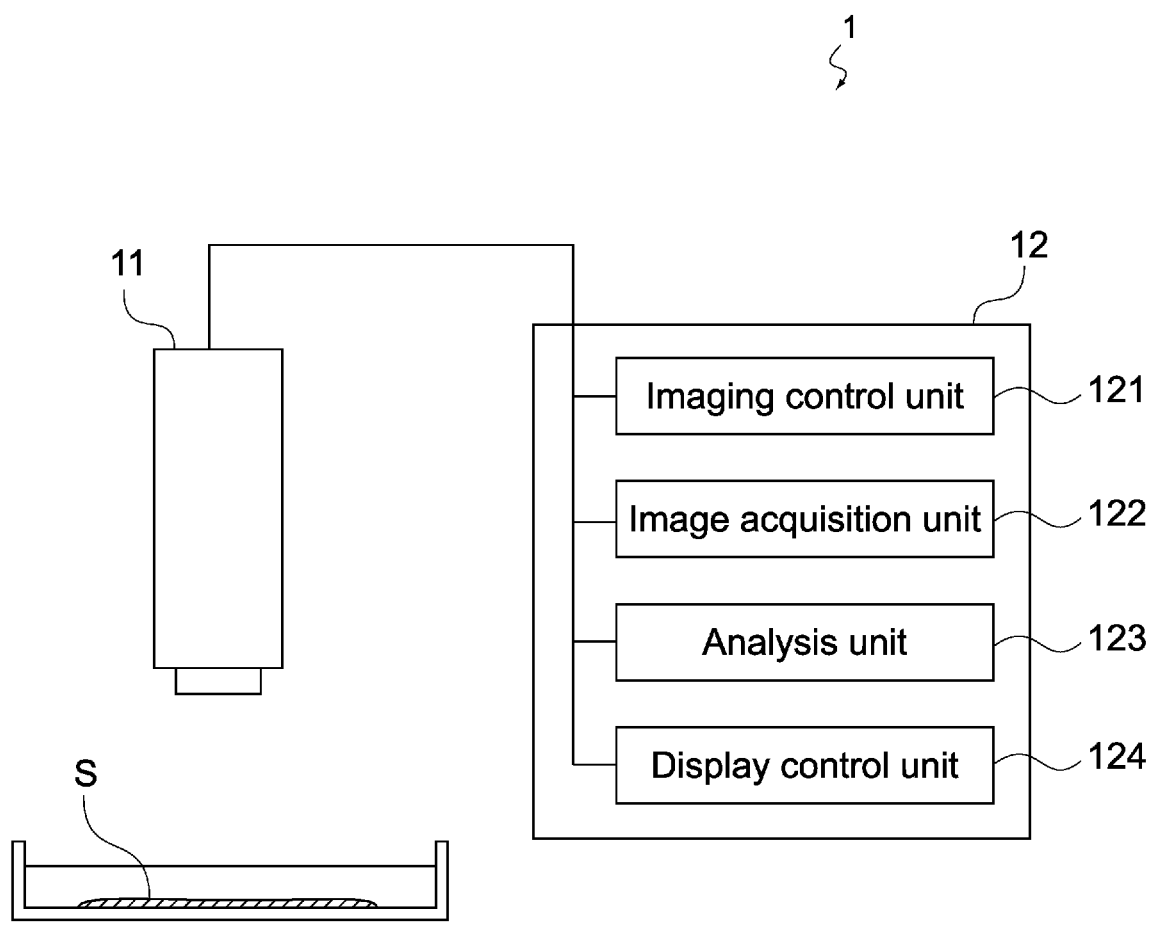
FIG. 1 is a schematic diagram showing a configuration of an information processing system according to a first embodiment of the present technology.

1. First Embodiment (Configuration of Information Processing System)
FIG. 1 is a schematic diagram showing a configuration of an information processing system 1 according to this embodiment. As shown in FIG. 1, the information processing system 1 includes an imaging apparatus 11 and an information processing apparatus 12. Further, FIG. 1 shows an observation target S. The observation target S may be cells cultured in a culture vessel, for example. The type of cells is not particularly limited, but it is desirable to use dividing cells of cancer cells, stem cells (ES cells or iPS cells), and the like as targets to be analyzed by the information processing system 1.

The imaging apparatus 11 is an apparatus capable of imaging the observation target S over time and generating images. The imaging apparatus 11 may be, for example, a microscope including a microscope optical system or an image sensor, and may be capable of capturing images (still images) at predetermined imaging intervals (for example, one or more frames per second) or capturing successive images (moving image). The imaging apparatus 11 may be controlled for an imaging range or the imaging intervals by the information processing apparatus 12.

The imaging range of the imaging apparatus 11 may be a range including one cell or a range including a cell group. An imaging method for the imaging apparatus 11 is not particularly limited and only needs to be an optical imaging method capable of acquiring images in a unstained manner, such as bright-field imaging, dark-field imaging, phase contrast imaging, fluorescence imaging, absorption spectrum imaging, and scattered-light imaging. Hereinafter, an image captured by the imaging apparatus 11 is called a captured image.

The information processing apparatus 12 acquires and processes a captured image captured by the imaging apparatus 11. The information processing apparatus 12 may be a personal computer, for example. It should be noted that the information processing apparatus 12 may be integrally configured in the imaging apparatus 11 or may be an apparatus separate from the imaging apparatus 11.

(Configuration and Operation of Information Processing Apparatus)

Figure 2:
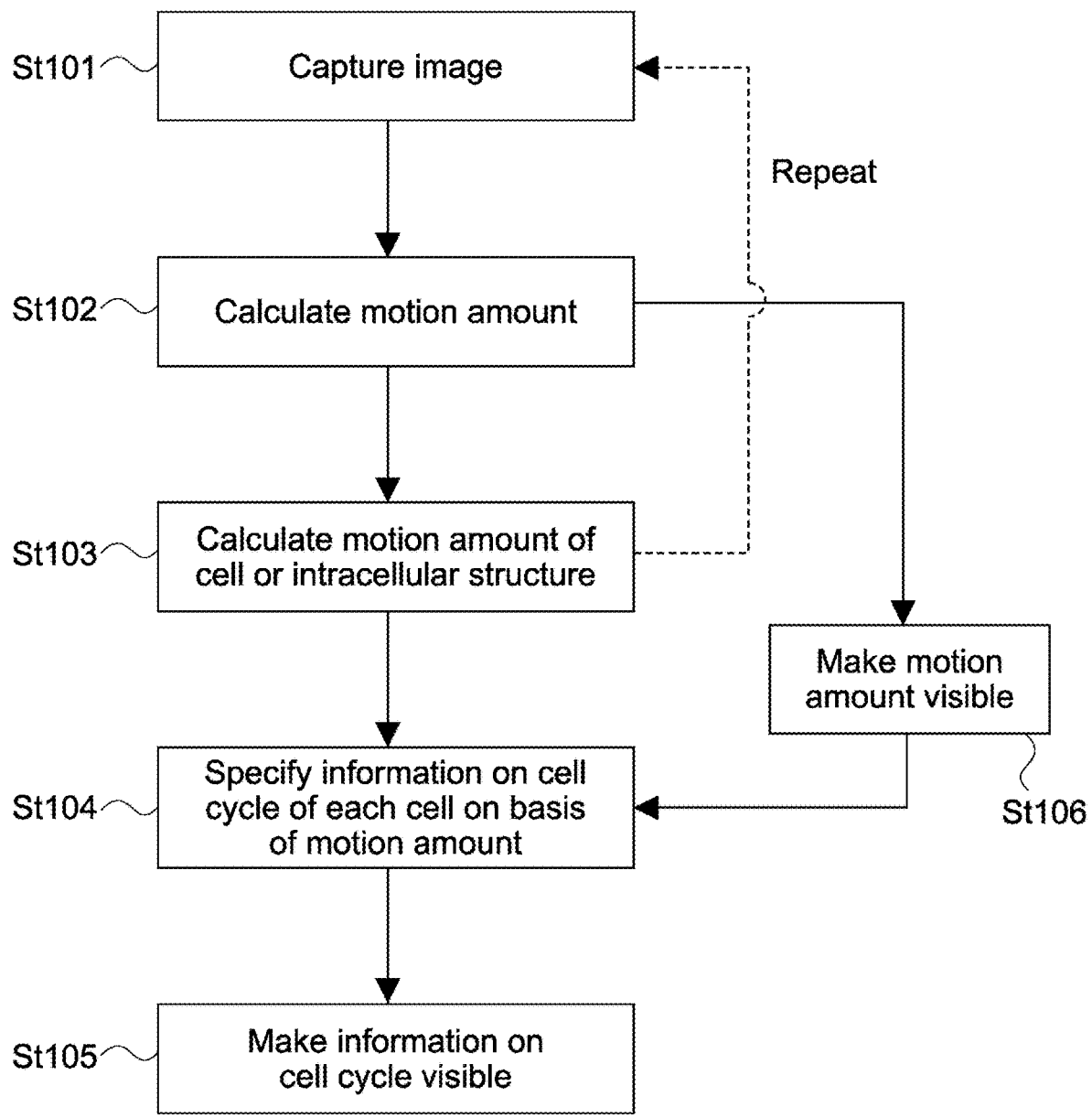
FIG. 2 is a flowchart showing an operation of an information processing apparatus of the information processing system.

As shown in FIG. 1, the information processing apparatus 12 includes, as a functional configuration, an imaging control unit 121, an image acquisition unit 122, an analysis unit 123, and a display control unit 124. FIG. 2 is a flowchart showing an operation of the information processing apparatus 12.

The imaging control unit 121 determines imaging intervals or an imaging range of the imaging apparatus 11 and causes the imaging apparatus 11 to capture an image (St101). For example, the imaging control unit 121 can perform control such that each of the imaging intervals of captured images (intervals of frames) is one second or less (one or more frames per second). A cell motion on a cell cycle is faster than a movement of a cell or the like. Thus, when the imaging interval is less than one frame per second, it is difficult to grasp a cell motion on a cell cycle.

The field of view of the imaging apparatus 11 may be a range including one cell, a range including a cell group, the entire field of view of the imaging apparatus 11, or the like. Further, the imaging control unit 121 may control the imaging apparatus 11 by using an image recognition result obtained by the analysis unit 123 that will be described later. For example, the imaging control unit 121 can control the imaging range of the imaging apparatus 11 so as to capture an image of a particular cell detected by the analysis unit 123.

Figure 11:
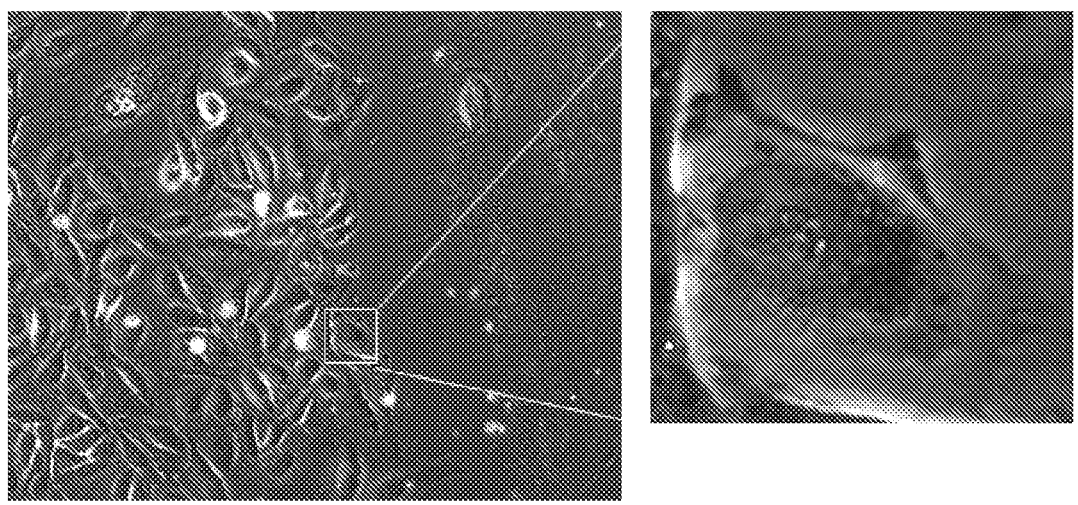
FIG. 11 is a captured image according to Example of the present technology.

The image acquisition unit 122 acquires a captured image (see FIG. 11). The image acquisition unit 122 may acquire a captured image directly from the imaging apparatus 11 or via storage or a network. The image acquisition unit 122 supplies the acquired captured image to the analysis unit 123.

The analysis unit 123 calculates a motion amount per unit time from the captured image (St102). The analysis unit 123 compares at least two captured images (frames), which are captured at different times, with each other and calculates a motion amount. For example, the analysis unit 123 may calculate a motion amount at a resolution (5 micrometers or less) capable of dividing an intracellular structure.

Figure 3:
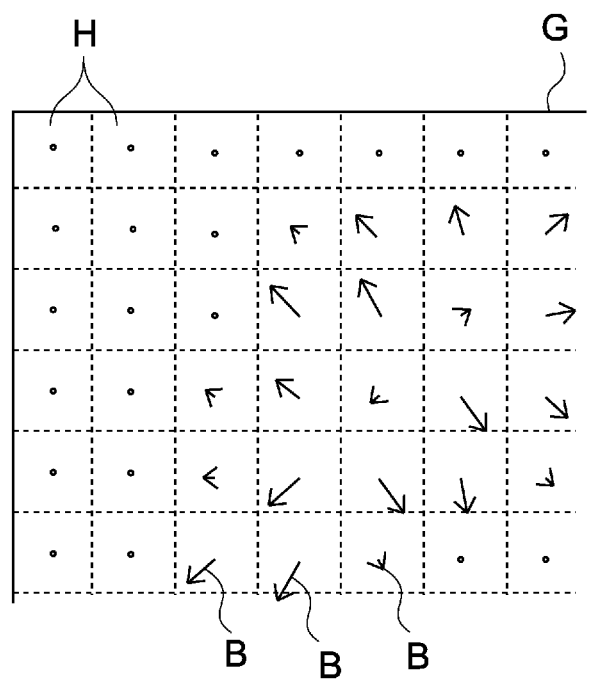
FIG. 3 is an example of motion vectors calculated by an analysis unit of the information processing apparatus.

Specifically, the analysis unit 123 extracts motion vectors between at least two captured images captured at different times. The analysis unit 123 can extract motion vectors by using a block matching method, a gradient method, or the like. FIG. 3 is an example of motion vectors extracted by the analysis unit 123. As shown in FIG. 3, the analysis unit 123 extracts a motion vector B in each of predetermined extracted sections H of a captured image G. The analysis unit 123 may extract motion vectors from the whole of the captured image or from a range designated by a user.

The length of the motion vector B is a motion amount. The analysis unit 123 can calculate a motion amount per unit time (motion speed) from an interval (time) between the two captured images from which the motion vectors B are extracted. It should be noted that the analysis unit 123 does not necessarily extract the motion vectors and may calculate a motion amount per unit time by another method.

Additionally, the analysis unit 123 specifies information on a cell cycle on the basis of the motion amount per unit time. The cell cycle is a cycle in which a cell born by cell division grows and causes cell division. The cell cycle progresses in the order of a G1 phase, an S phase, a G2 phase, and an M phase. In the S phase, duplication of DNA occurs. In the M phase, cell division occurs. The information on a cell cycle includes a position of a cell cycle (a phase of the cell cycle in which a specific cell exists) and the length of the cell cycle (time from the M phase to the next M phase). In some embodiments, information on the cell cycle may provide an indication of cell metabolism. Such an indication of cell metabolism may be determined by relating one or more parameters of motion amount of one or more cells to phases of the cell cycle. In this manner, a cell cycle phase may provide an indication of a degree of cell metabolism.

The analysis unit 123 can extract a parameter on the motion amount, such as an average value, a median value, a maximum value, or a standard deviation of the motion amount per unit time, and specify the information on a cell cycle on the basis of the parameter.

Specifically, the analysis unit 123 can perform image recognition processing on the captured image and specify information on a cell cycle by using the parameter and a result of the image recognition processing. For example, the analysis unit 123 can detect a cell, a cell group, an intracellular structure, or the like included in the captured image by performing pattern matching processing between the captured image and a reference image of the intracellular structure (granule, fiber, pseudopod, or the like), learning-based image recognition processing, image recognition processing using luminance value distribution, or the like. Further, specifying a cell may be performed on the basis of a designation of a range on the captured image by the user.

Figure 4:
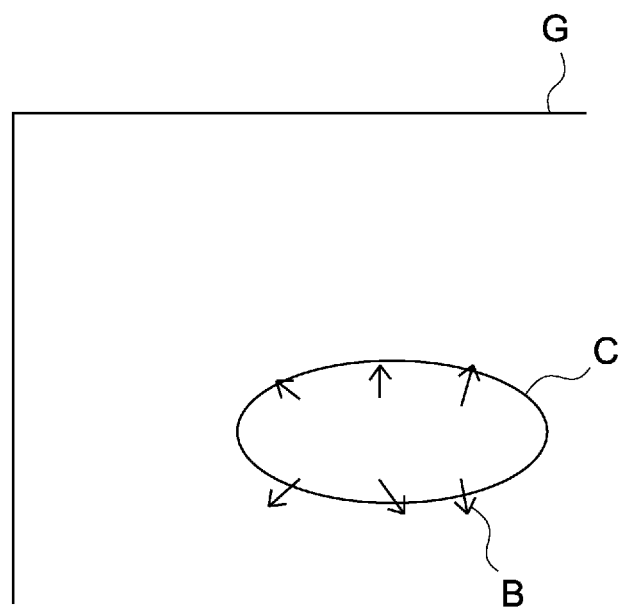
FIG. 4 is an example of motion vectors extracted by the analysis unit of the information processing apparatus.

The analysis unit 123 can calculate the motion amount per unit time in each cell or intracellular structure detected by the image recognition processing or by a designation by the user (St103). FIG. 4 is a schematic diagram showing a motion amount per unit time calculated in each cell. As shown in FIG. 4, if a cell C is recognized in a captured image G, the analysis unit 123 can calculate a motion amount from only motion vectors B extracted from an area corresponding to the range of the cell C in the captured image G.

The analysis unit 123 specifies the information on a cell cycle on the basis of the parameter on the motion amount per unit time in each cell or intracellular structure (St104).

Figure 5:
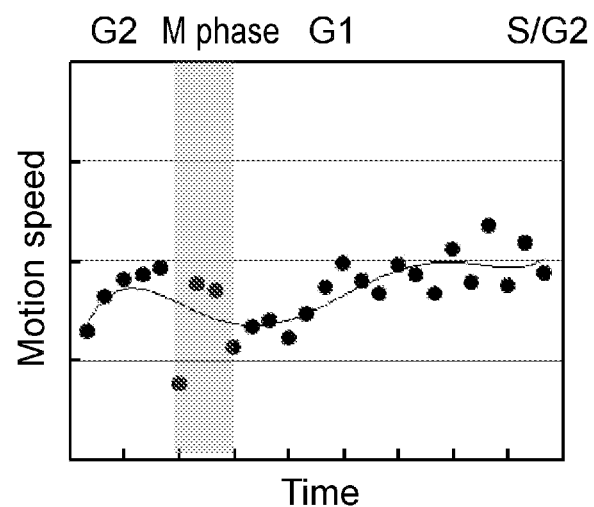
FIG. 5 is a graph showing a temporal change in motion amount per unit time, which is calculated by the analysis unit of the information processing apparatus.

FIG. 5 is a graph showing an average value of the motion amount per unit time (motion speed) calculated for a cell included in a captured image. As shown in FIG. 5, the motion amount per unit time changes in accordance with a position of the cell cycle, and thus it is possible to specify the information on a cell cycle on the basis of the motion amount per unit time.

Specifically, the analysis unit 123 can calculate an average of the motion amount per unit time in each cell and specify the position of the cell cycle on the basis of that correlation. For example, in many cells, the motion amount per unit time in the M phase is the smallest, and thus the M phase can be specified from the transition of the motion amount per unit time. Additionally, cells immediately after the shift to the M phase tend to increase in motion amount per unit time, and thus the start of the M phase can also be specified from the transition of the motion amount per unit time.

Further, the analysis unit 123 can refer to an average value of the motion amount per unit time previously specified in each type of cells (cancer cells or the like), to specify the position of the cell cycle. Specifically, the analysis unit 123 can successively acquire an average value of the motion amount per unit time at specific time intervals as in the Examples and specify the position of the cell cycle on the basis of a relative change amount thereof. Alternatively, the analysis unit 123 can previously acquire waveform data of a target cell and refer to that waveform data, to specify the position of the cell cycle.

Additionally, the analysis unit 123 can acquire waveform information of the motion amount per unit time in a certain period of time (see FIG. 5), to specify the length of the cell cycle. For example, if the M phase can be specified from the waveform information, a time from the M phase to the next M phase can be set as the length of the cell cycle. It should be noted that the analysis unit 123 can also reduce a measurement time or the number of measurements by previously acquiring waveform data of a target cell and performing fitting on the waveform data. The analysis unit 123 supplies information on the specified cell cycle to the display control unit 124.

The display control unit 124 makes the information on a cell cycle visible for output (St105). The display control unit 124 can generate an image in which the information on a cell cycle is superimposed on the captured image, and display the cell in color display in accordance with the position of the cell cycle (G1 phase, M phase, and the like), for example. The superposition image may be generated for a plurality of captured images captured at different times or may be generated by extracting only an individual cell specified by the analysis unit 123. Further, the display control unit 124 may display the number of cells located in a position of each cell cycle or may display, by mapping, each cell cycle on the waveform information of the motion amount per unit time in a certain period of time. The display control unit 124 outputs those analysis results to a display or the like to be presented to the user.

It should be noted that the information processing apparatus 12 can intermittently repeat processing from the step of capturing an image (St101) to the step of calculating a motion amount per unit time in each cell or intracellular structure (St103), to improve calculation accuracy of the motion amount of a cell or intracellular structure.

Modified Example

Figure 6:
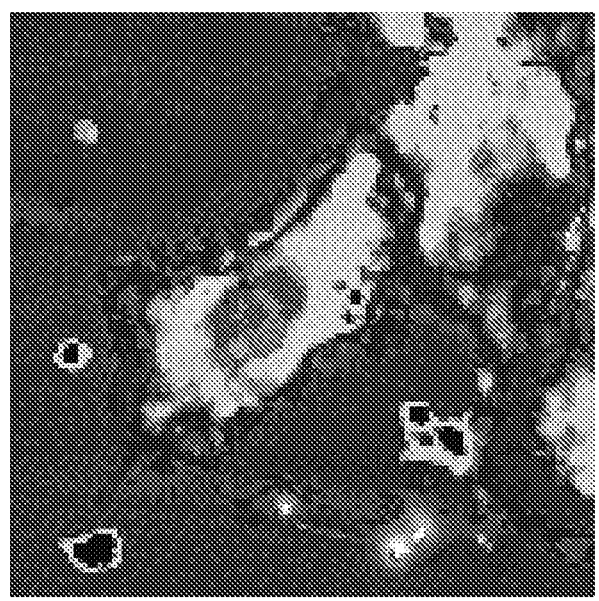
FIG. 6 is an image in which a motion amount per unit time generated by an output unit of the information processing apparatus is made visible.

The display control unit 124 may make visible the parameter on the motion amount per unit time calculated by the analysis unit 123 (St106). FIG. 6 is an example of an image in which an average value of the motion amount per unit time in each cell shown in FIG. 5 is made visible. An area having a large average value of the motion amount per unit time is shown in white. The display control unit 124 can output an image in which the parameter on the motion amount per unit time is made visible to a display or the like, to be presented to the user. The visible image may be generated for a plurality of captured images captured at different times or may be generated by extracting only an individual cell specified by the analysis unit 123. The user can refer to the image and estimate information on a cell cycle on the basis of the motion amount per unit time.

As described above, the information processing system 1 can specify information on a cell cycle by using a motion amount per unit time from an image of a cell. Staining of a cell is not necessary to perform, and an evaluation of a cell cycle in a non-destructive, non-invasive, and unstained manner can be performed. The information processing system 1 can be suitable for use in quality control of cells, evaluation of a status of cell differentiation, specifying highly (slowly) proliferative special cells, detection of abnormal cells, evaluation of a cytotoxic activity of anti-cancer drugs or the like, evaluation of side effects of medicines, and the like.

(Hardware Configuration of Information Processing Apparatus)

The functional configuration of the information processing apparatus 12 as described above can be achieved by a hardware configuration described below.

Figure 7:
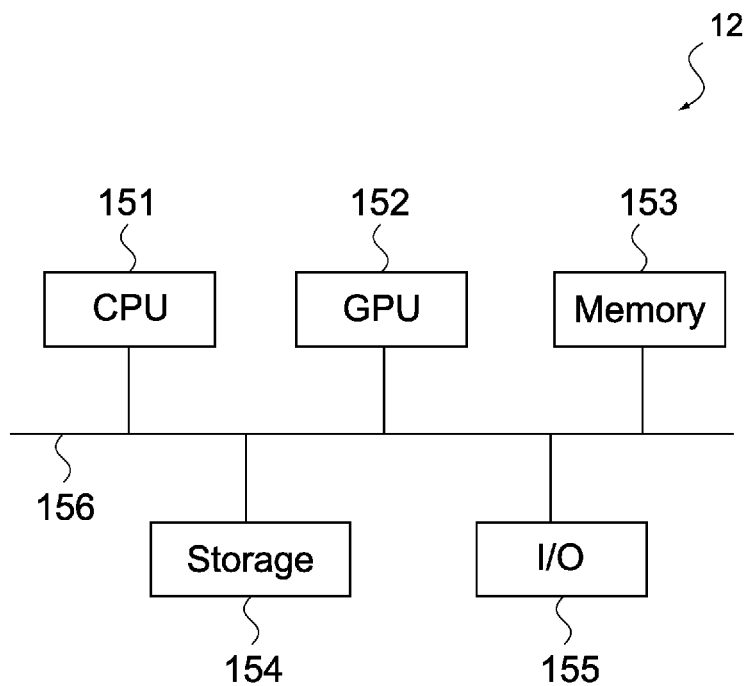
FIG. 7 is a schematic diagram showing a hardware configuration of the information processing apparatus.

FIG. 7 is a schematic diagram showing a hardware configuration of the information processing apparatus 12. As shown in FIG. 7, the information processing apparatus 12 includes, as a hardware configuration, a CPU (Central Processing Unit) 151, a GPU (Graphic Processing Unit) 152, a memory 153, storage 154, and an input and output unit (I/O) 155. Those components are connected to one another via a bus 156.

The CPU 151 controls other configurations according to a program stored in the memory 153, and also performs data processing according to the program, to store a processing result in the memory 153. The CPU 151 may be a microprocessor.

The GPU 152 is controlled by the CPU 151 to execute image processing. The CPU 151 can cause the GPU 152 to execute parallel computing, to extract a feature amount at high speed. The GPU 152 may be a microprocessor.

The memory 153 stores programs and data executed by the CPU 151. The memory 153 may be a RAM (Random Access Memory).

The storage 154 stores programs and data. The storage 154 may be an HDD (Hard disk drive) or an SSD (solid state drive).

The I/O 155 receives an input to the information processing apparatus 12 and supplies an output of the information processing apparatus 12 to the outside. The I/O 155 includes input devices such as a keyboard and a mouse, output devices such as a display, and connection interfaces such as a network.

The hardware configuration of the information processing apparatus 12 is not limited to those described herein, and may be any configuration as long as the functional configuration of the information processing apparatus 12 can be achieved. Further, a part or whole of the hardware configuration described above may be present over the network.

2. Second Embodiment

Next, a second embodiment of the present technology will be described. "Configuration of Information Processing System" and "Hardware Configuration of Information Processing Apparatus" of the second embodiment are similar to those in the first embodiment. In the second embodiment, description will be given on the case where the present technology is applied not to specify information on a cell cycle but to evaluate the stats of an intracellular metabolism or the status of a cytoskeleton.

As a result of repetitive examination on factors of correlativity between a cell cycle and a motion, the inventors found out that intracellular granules, particularly endosome granules change depending on a cell cycle. The endosome granules are known to suppress a motion by metabolic inhibition. Measuring the motions of intracellular granules including endosome granules makes it possible to evaluate a metabolic status of cells (the amount of ATP production). In some embodiments, ATP production may provide an indication of cell metabolism. Such an indication of cell metabolism may be determined by relating one or more parameters of motion amount of one or more cells to amounts of ATP production. In this manner, an amount of ATP production may provide an indication of a degree of cell metabolism. Further, the endosome granules are known to move on a microtubule. Measuring the motions of intracellular granules including endosome granules makes it possible to evaluate the status of a cytoskeleton (microtubule). In some embodiments, the status of a cytoskeleton may provide an indication of cell metabolism. Such an indication of cell metabolism may be determined by relating one or more parameters of motion amount of one or more cells to the stability of the cytoskeleton. In this manner, a degree of cytoskeleton (e.g., microtubule) stability may provide an indication of a degree of cell metabolism.

(Configuration and Operation of Information Processing Apparatus)

Figure 18:
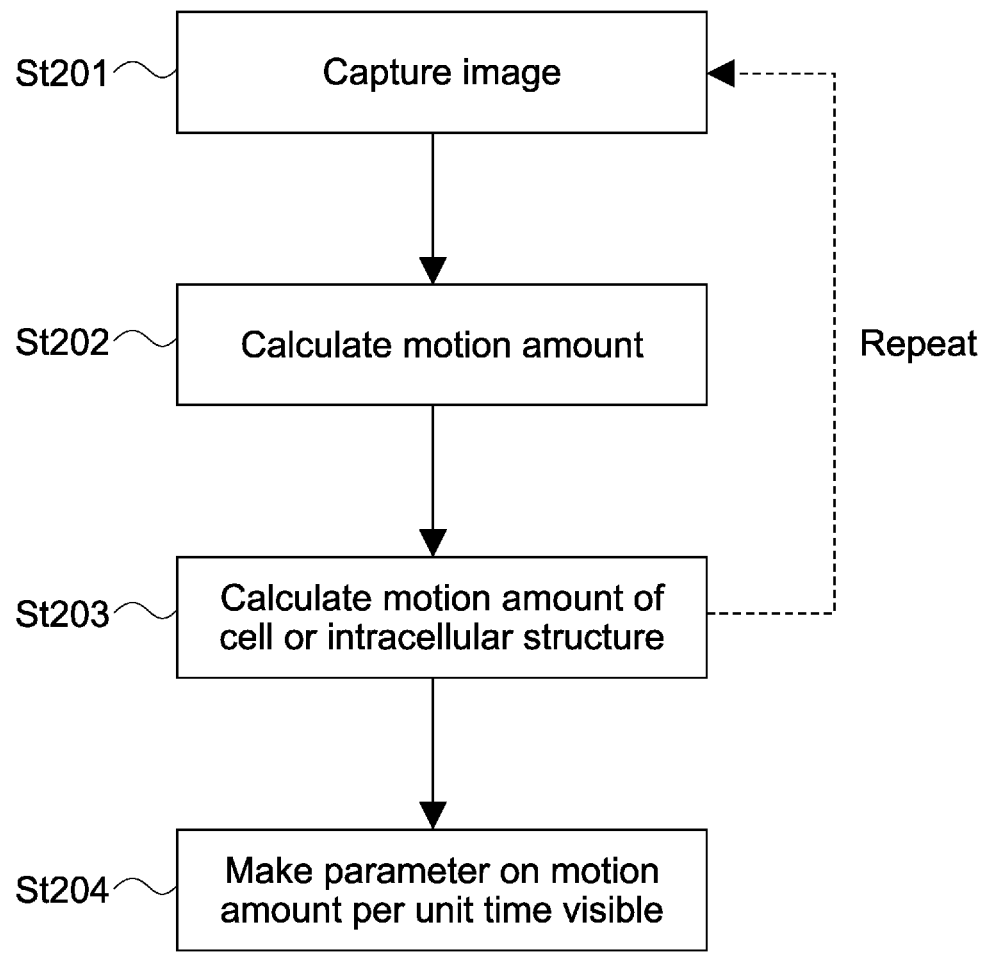
FIG. 18 is a flowchart showing an operation of an information processing apparatus of an information processing system according to a second embodiment of the present technology.

A functional configuration of an information processing apparatus in the second embodiment is similar to the configuration shown in FIG. 1 of the first embodiment. Further, an imaging control unit 121 and an image acquisition unit 122 as the configuration of an information processing apparatus 12, and an imaging apparatus 11 are also similar to those of the first embodiment, and thus an analysis unit 123 and a display control unit 124 will be specifically described. FIG. 18 is a flowchart showing an operation of the information processing apparatus 12 according to this embodiment.

After the imaging control unit 121 determines imaging intervals or an imaging range of the imaging apparatus 11 and causes the imaging apparatus 11 to capture an image (St201), the analysis unit 123 calculates a motion amount per unit time from the captured image (St202). The analysis unit 123 compares at least two captured images (frames), which are captured at different times, with each other and calculates a motion amount. For example, the analysis unit 123 may calculate a motion amount at a resolution (5 micrometers or less) capable of dividing an intracellular structure.

Specifically, the analysis unit 123 extracts motion vectors between at least two captured images captured at different times. The analysis unit 123 can extract motion vectors by using a block matching method, a gradient method, or the like. FIG. 3 is an example of motion vectors extracted by the analysis unit 123. As shown in FIG. 3, the analysis unit 123 extracts a motion vector B in each of predetermined extracted sections H of a captured image G. The analysis unit 123 may extract motion vectors from the whole of the captured image or from a range designated by a user.

The length of the motion vector B is a motion amount. The analysis unit 123 can calculate a motion amount per unit time (motion speed) from an interval (time) between the two captured images from which the motion vectors B are extracted. It should be noted that the analysis unit 123 does not necessarily extract the motion vectors and may calculate a motion amount per unit time by another method.

Additionally, the analysis unit 123 extracts a parameter on a motion amount, with which a metabolic status or a cytoskeleton status of a cell can be evaluated, on the basis of the motion amount per unit time. As the parameter on the motion amount, an average value, a median value, a maximum value, a standard deviation, a relative motion area, or the like of the motion amount per unit time is extracted. The relative motion area is a parameter indicating a proportion of a motion area to a cell area and is a useful index in the case of comparison with a target, such as evaluation of a medicine. Relative motion area is a proportion of a motion area to a cell area. The cell area can be calculated by the image recognition process for the image. The motion area can be calculated by determining area having a motion value larger than a threshold value.

Specifically, the analysis unit 123 can perform image recognition processing on the captured image and extract the parameter described above. For example, the analysis unit 123 can detect a cell, a cell group, an intracellular structure, or the like included in the captured image by performing pattern matching processing between the captured image and a reference image of the intracellular structure (granule, fiber, pseudopod, or the like), learning-based image recognition processing, image recognition processing using luminance value distribution, or the like. Further, specifying a cell may be performed on the basis of a designation of a range on the captured image by the user.

The analysis unit 123 can calculate the motion amount per unit time in each cell or intracellular structure detected by the image recognition processing or by a designation by the user (St203).

The display control unit 124 makes a parameter on the motion amount per unit time visible for output (St204), the motion amount per unit time being calculated by the analysis unit 123. An image in which the parameter on the motion amount per unit time is made visible can be output to a display or the like to be presented to the user. The visible image may be generated for a plurality of captured images captured at different times or may be generated by extracting only an individual cell specified by the analysis unit 123. The user can refer to such an image and evaluate the status of an intracellular metabolism or the status of a cytoskeleton.

Further, in the case where the parameter on the motion amount is calculated for each of captured images of cells in the analysis unit 123, the cells being cultured on different conditions, the display control unit 124 can also output the parameter on the motion amount, which is calculated for each cell, as a graph or an image. For example, in the case of evaluation of a medicine, an image of a cell to which at least one kind of medicine is administered and an image of a comparative cell to which nothing is administered can be captured, and respective parameters on the motion amount can be output to a display or the like as a graph or an image to be presented to the user. From the graph, a user can refer to a difference in results between the cell to which a medicine is administered and the comparative cell to which nothing is administered, and thus can evaluate an influence of the medicine to the status of an intracellular metabolism or the status of a cytoskeleton.

Additionally, it is also possible to refer to the parameter on the motion amount for a comparative cell, which is previously acquired in the analysis unit 123, to estimate the status of an intracellular metabolism or the status of a cytoskeleton on the basis of the parameter on the motion amount of a cell to which a medicine is administered. The display control unit 124 outputs the status of an intracellular metabolism or the status of a cytoskeleton, which is estimated in the analysis unit 123, to a display or the like to be presented to the user.

As described above, the information processing system 1 can output information, with which the status of an intracellular metabolism or the status of a cytoskeleton can be evaluated, by using a parameter on a motion amount from an image of a cell. Staining of a cell is not necessary to perform, and an evaluation of the status of an intracellular metabolism or the status of a cytoskeleton in a non-destructive, non-invasive, and unstained manner can be performed. The information processing system 1 can be suitable for use in quality control of cells, evaluation of a cytotoxic activity of anticancer drugs or the like, evaluation of side effects of medicines, and the like.

EXAMPLES

Example 1: Change in Motion Speed Associated with Cell Cycle

After U2OS cells were cultured in a non-serum culture medium for 48 hours, 10% of fetal bovine serum was added thereto, to perform cell cycle synchronization among cells. If cultivation is performed in the non-serum culture medium, the cell cycle stopes before the S phase, and if fetal bovine serum is added, the cell cycle is started from the S phase. Thus, the cell cycles of almost all cultured cells can be synchronized. Images (moving image) were captured over time with a phase contrast microscope every hour from a time point at which the fetal bovine serum was added. The magnification power of the microscope was 20×, the imaging interval was 5 frames per second, and the imaging time was 60 seconds.

Motion vectors were calculated at intervals of approximately 1 micrometer, to calculate a spatiotemporal average of the motion amount within a captured image. On the basis of the proportion of cells within the captured image, a cell area was also calculated.

Figure 8:
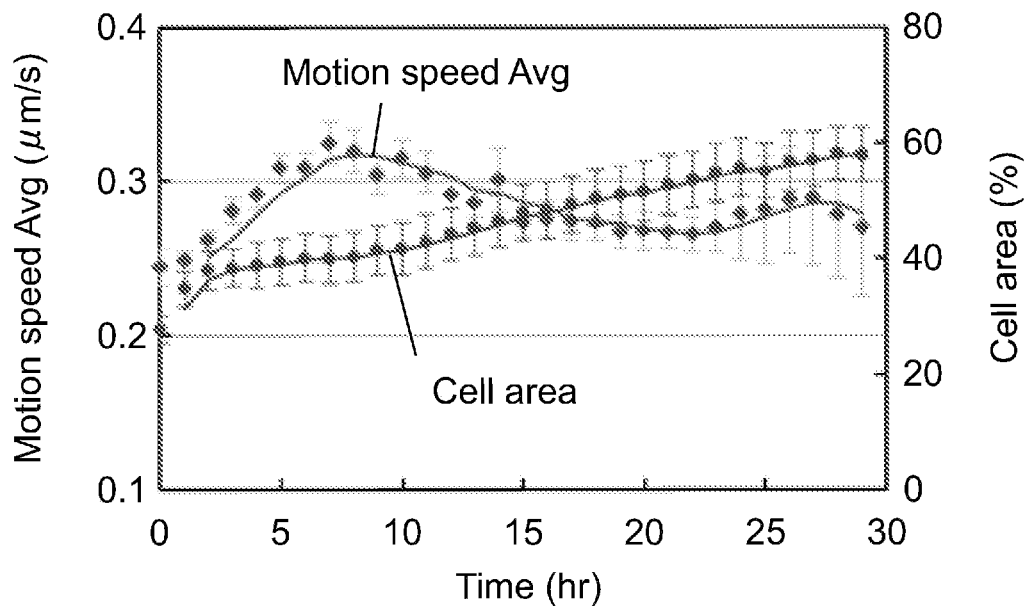
FIG. 8 is a graph showing a temporal change in motion amount per unit time according to Example of the present technology.

FIG. 8 is a graph showing temporal changes in average value (Motion speed Avg) of the motion amount per unit time (motion speed) and in cell area. An average value of the motion amount increased for approximately 8 hours after serum stimulation, gradually decreased after the increase, and increased again after the elapse of approximately 17 hours. When the position of the cell cycle was checked by a staining technique (Cell clock: biocolor) 4 hours after and 30 hours after, it was found in both of the cases that cells in the G1 phase were present more and cells in other cell cycles were also included. The cell area represents cell growth, and a growth rate was found to be increased in 9 hours and after where the motion speed reaches a local maximum and gradually decreases. In this time range, the phase shifts from G2, M, to G1 phases, in which an increase in speed is found in minute areas because many cells are dividing.

Example 2: Comparison in Motion Speed Between G1 Phase and G2 Phase

Images (moving image) of U2OS cells were captured with a phase contrast microscope. The magnification power of the microscope was 20×, the imaging interval was 5 frames per second, and the imaging time was 60 seconds. After that, the G1 phase and the G2 phase were distinguished by a staining technique (Cell clock: biocolor).

Motion vectors were calculated at intervals of approximately 1 micrometer, to calculate spatiotemporal averages of the motion amount per unit time (motion speed) for the cells respectively distinguished to be in the G1 phase and in the G2 phase.

Figure 9:
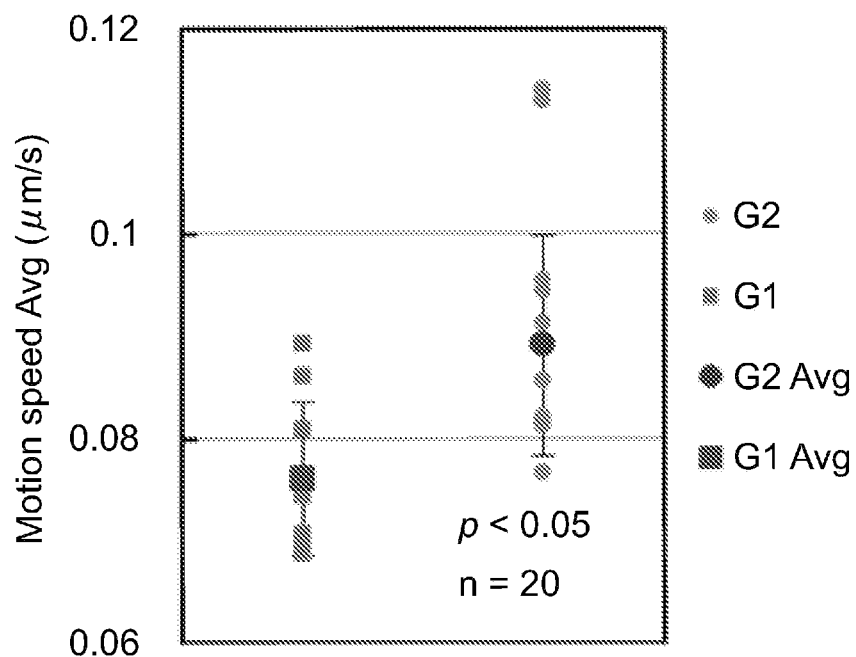
FIG. 9 is a graph showing a difference in motion amount per unit time due to a position of a cell cycle according to Example of the present technology.

FIG. 9 is a graph showing spatiotemporal averages (Motion speed Avg) of the motion speed respectively calculated for cells in the G1 phase and in the G2 phase. As shown in FIG. 9, it is found that the cells in the G1 phase have a motion speed statistically significantly lower than the cells in the G2 phase.

Example 3: Stop of G1 Phase Due to Contact Inhibition

U2OS cells were sowed at high density, and images (moving image) were continuously captured with a phase contrast microscope every hour. The magnification power of the microscope was 20×, the imaging interval was 5 frames per second, and the imaging time was 60 seconds. After motion vectors were calculated at intervals of approximately 1 micrometer, a spatiotemporal average of the motion amount per unit time (motion speed) within a captured image was calculated. On the basis of the proportion of cells within the captured image, a cell area was also calculated.

Figure 10:
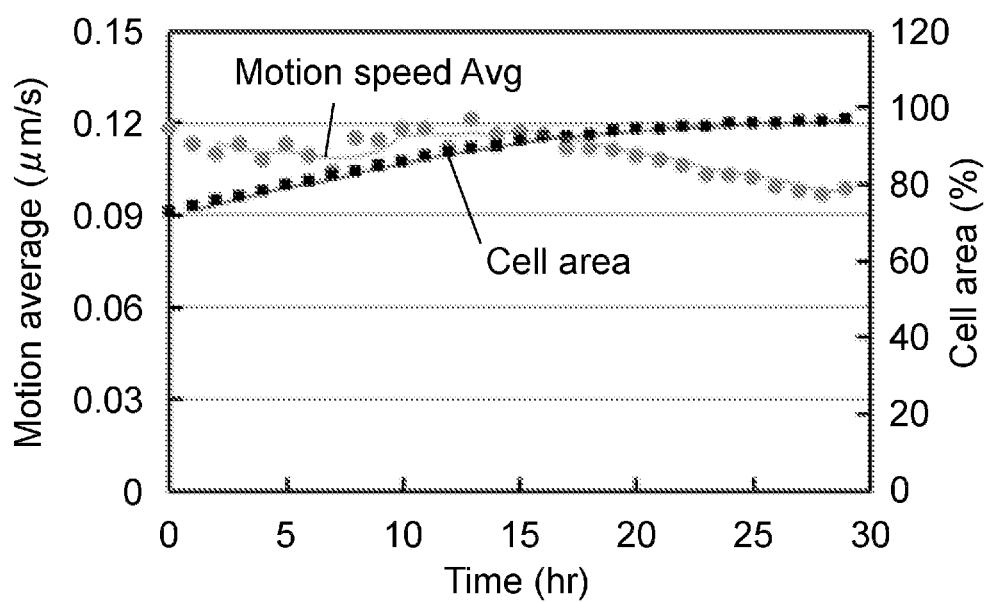
FIG. 10 is a graph showing a temporal change in motion amount per unit time according to Example of the present technology.

FIG. 10 is a graph showing temporal changes in average value (Motion speed Avg) of the motion amount per unit time (motion speed) and in cell area. As shown in FIG. 10, the cell area reaches 100% in approximately 15 hours, and cell growth is suppressed there. By this suppression of the cell growth due to contact (contact inhibition), the cell cycle stopes in the G1 phase. It is shown that after the elapse of 15 hours and more where the growth is suppressed, the average value of the motion speed is reduced, and the motion speed is reduced because the cells in the G1 phase increase due to the contact inhibition.

Example 4: Making Motion Speed of Intracellular Structure Visible

Images (moving image) of U2OS cells were captured with a phase contrast microscope. The magnification power of the microscope was 20×, the imaging interval was 5 frames per second, and the imaging time was 60 seconds. FIG. 11 shows a captured phase contrast image and its enlarged image. In the phase contrast image, a peripheral part (mainly pseudopod) of a cell, intracellular granules, and intracellular fibers are observed.

Figure 12:
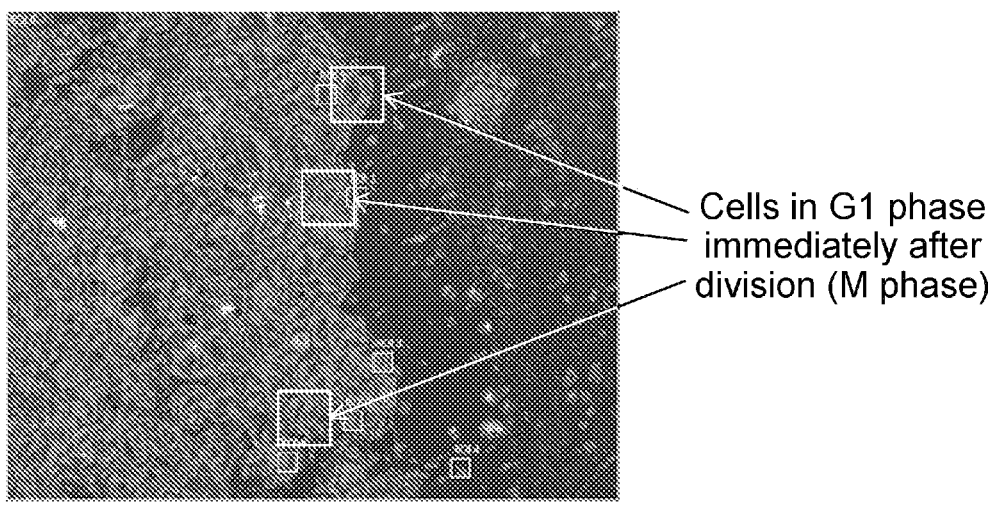
FIG. 12 is an image in which a motion amount per unit time is made visible according to Example of the present technology.

After motion vectors were calculated at intervals of approximately 1 micrometer, a spatiotemporal average of the motion amount per unit time (motion speed) in each set of coordinates was calculated, and a color map was created. FIG. 12 is the color map. It is shown that a motion speed of intracellular granules is fast, and a motion speed of intracellular granules of cells in the G1 phase (in square frames) immediately after the division phase (M phase) is relatively slow.

Example 5: Change in Motion Speed in Each Cell

Images (moving image) of U2OS cells were captured with a phase contrast microscope. The magnification power of the microscope was 20×, the imaging interval was 5 frames per second, and the imaging time was 60 seconds. After motion vectors were calculated at intervals of approximately 1 micrometer, three cells were specified from the image and an average of the motion amount per unit time (motion speed) was calculated in each cell.

Figure 13:
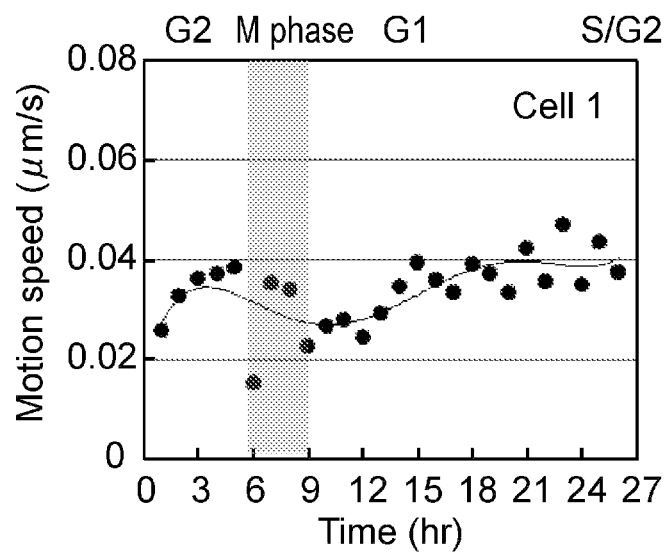
FIG. 13 is a graph showing a temporal change in motion amount per unit time according to Example of the present technology.
Figure 14:
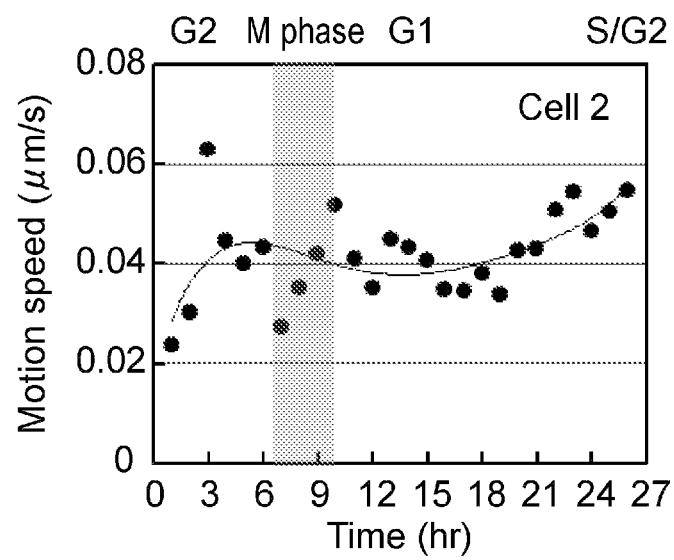
FIG. 14 is a graph showing a temporal change in motion amount per unit time according to Example of the present technology.
Figure 15:
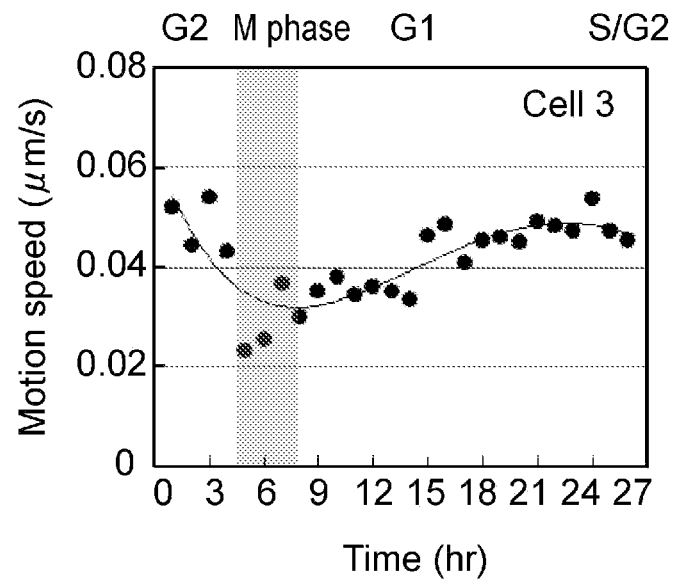
FIG. 15 is a graph showing a temporal change in motion amount per unit time according to Example of the present technology.
Figure 16:
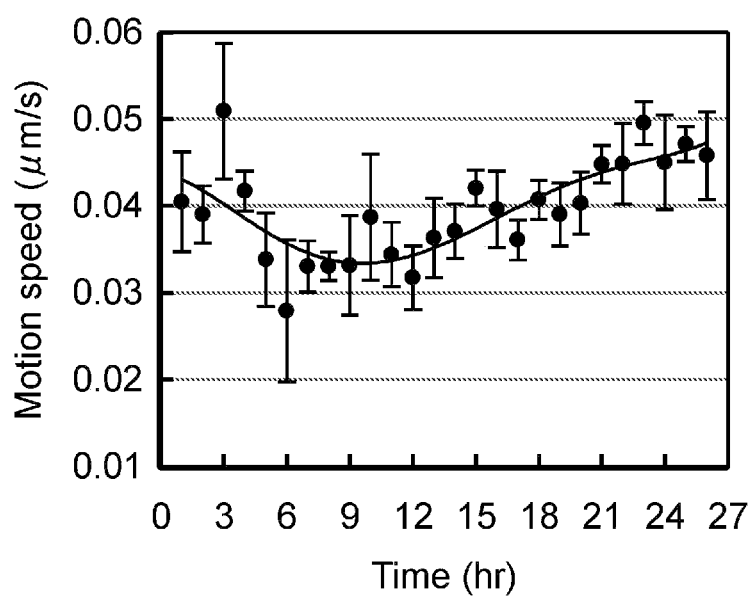
FIG. 16 is a graph showing a temporal change in motion amount per unit time according to Example of the present technology.

FIGS. 13 to 15 are graphs each showing a temporal change in average value (Motion speed Avg) of a motion amount per unit time (motion speed) in each cell. FIG. 16 is a graph showing an average of the motion amount per unit time (motion speed) of three cells. As shown in those figures, it is found that the motion amount per unit time in each cell changes in accordance with the cell cycle, and the tendency by the cell cycle (for example, the motion amount per unit time is reduced in the M phase) is matched thereamong.

Figure 17:
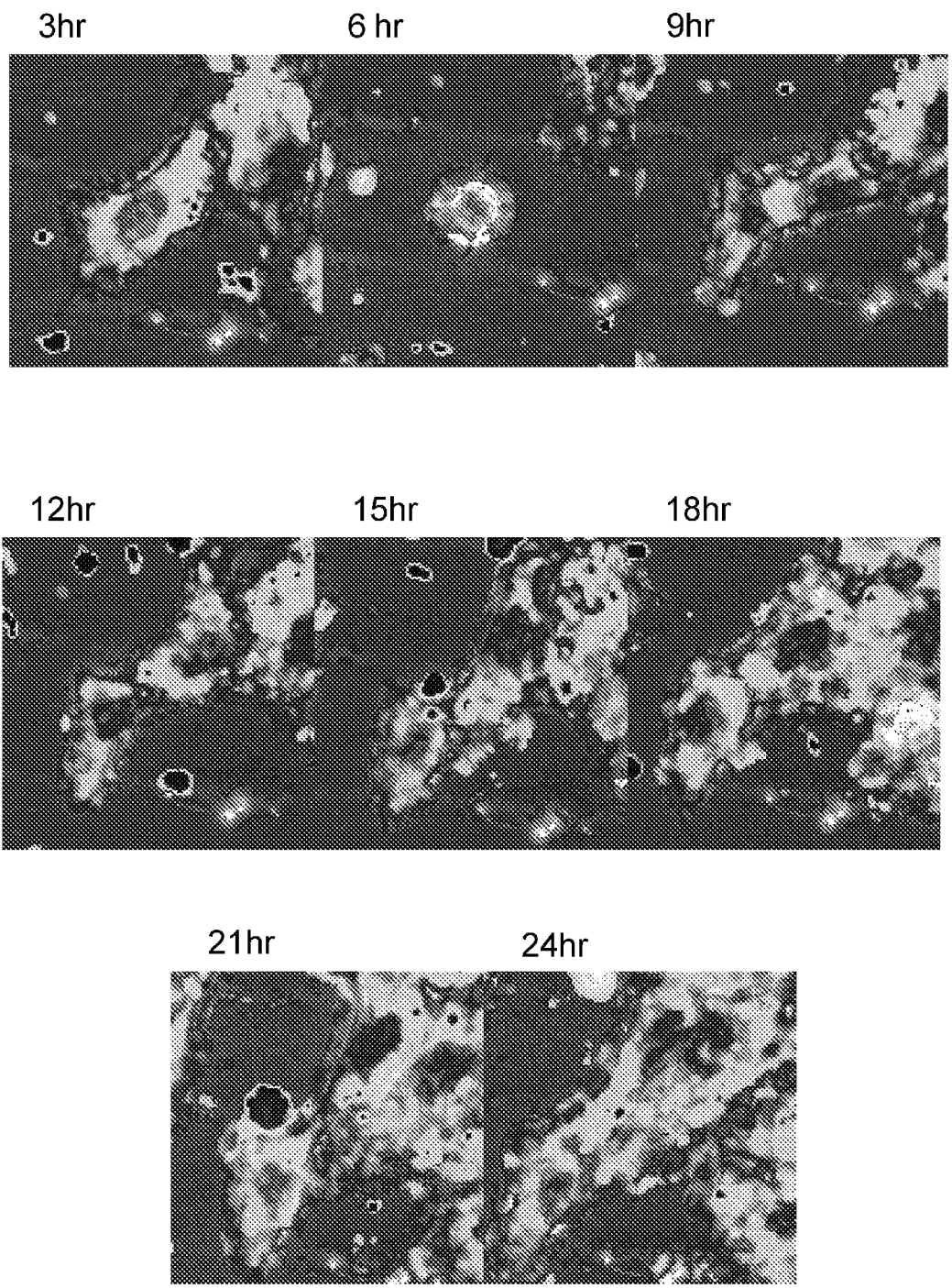
FIG. 17 is an image in which a motion amount per unit time is made visible according to Example of the present technology.

FIG. 17 is an image in which an average value of the motion amount per unit time in one cell is made visible. An area having a large average value of the motion amount per unit time is shown in white. It is possible to grasp from the image that the average value of the motion amount per unit time fluctuates in accordance with the cell cycle.

Example 6: Change in Motion Speed by Microtubule Disruption

Images (moving image) of U2OS cells cultured on different conditions were captured with a phase contrast microscope. Three types of cells, i.e., a cell to which Paclitaxel of 2 micro M is administered, a cell to which Nocodazole of 2 micro M is administered, and a comparative cell to which nothing is administered, were prepared. The Paclitaxel stabilizes a microtubule. The Nocodazole destabilizes a microtubule. The magnification power of the microscope was 20×, the imaging interval was 5 frames per second, and the imaging time was 20 minutes. After motion vectors were calculated at intervals of approximately 1 micrometer, a spatiotemporal average of the motion amount per unit time (motion speed) of each coordinate was calculated, to create a color map. Further, on the basis of the proportion of the cell within the captured image, a cell area and a motion area indicating a motion speed larger than a predetermined motion speed were calculated, and a relative motion area indicating a proportion of the motion area to the cell area was specified, to create a graph.

Figure 19:
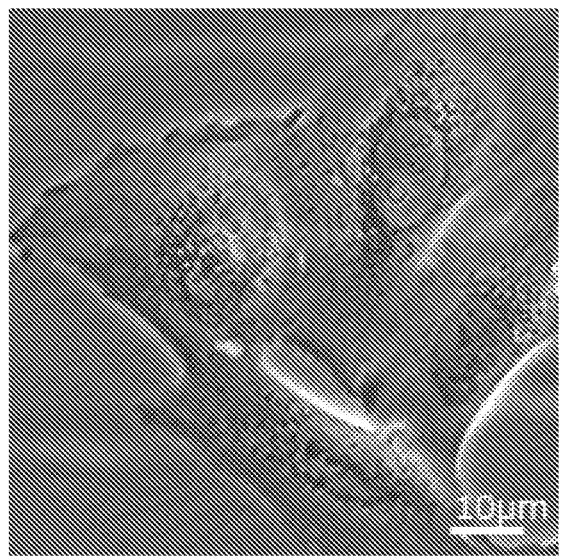
FIG. 19 is a phase-contrast image of a comparative cell to which nothing is administered, according to Example of the present technology.
Figure 20:
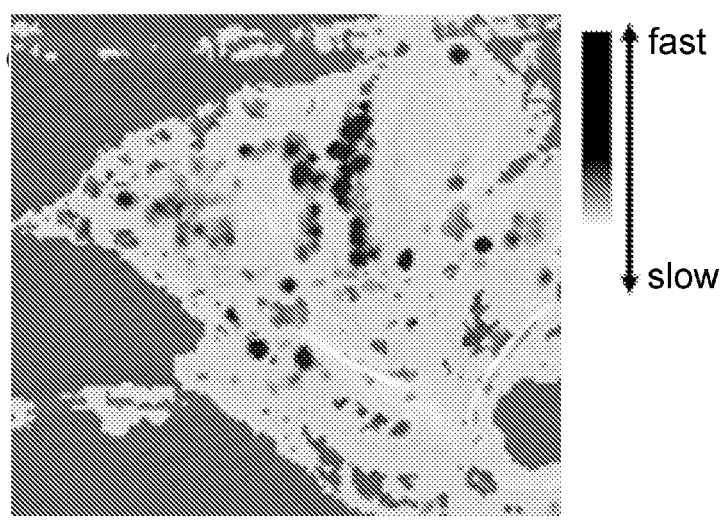
FIG. 20 is a color map of the comparative cell to which nothing is administered, according to Example of the present technology.
Figure 21:
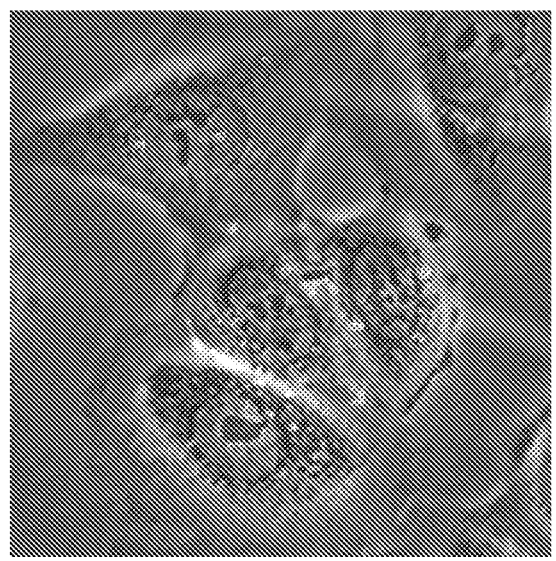
FIG. 21 is a phase-contrast image of a cell to which Paclitaxel is administered, according to Example of the present technology.
Figure 22:
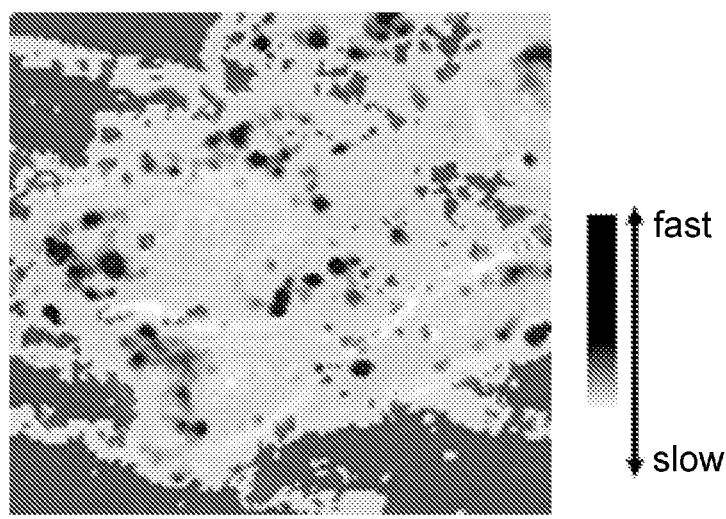
FIG. 22 is a color map of the cell to which Paclitaxel is administered, according to Example of the present technology.
Figure 23:
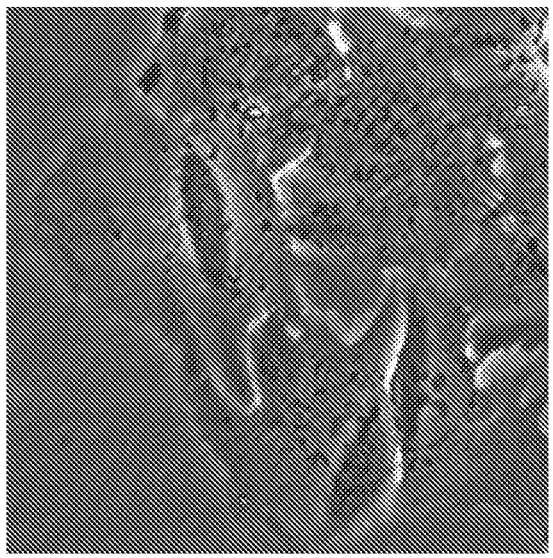
FIG. 23 is a phase-contrast image of a cell to which Nocodazole is administered, according to Example of the present technology.
Figure 24:
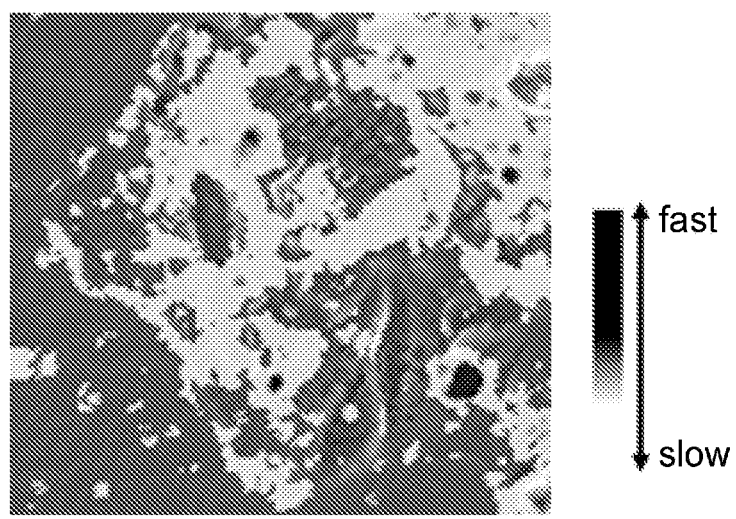
FIG. 24 is a color map of the cell to which Nocodazole is administered, according to Example of the present technology.
Figure 25:
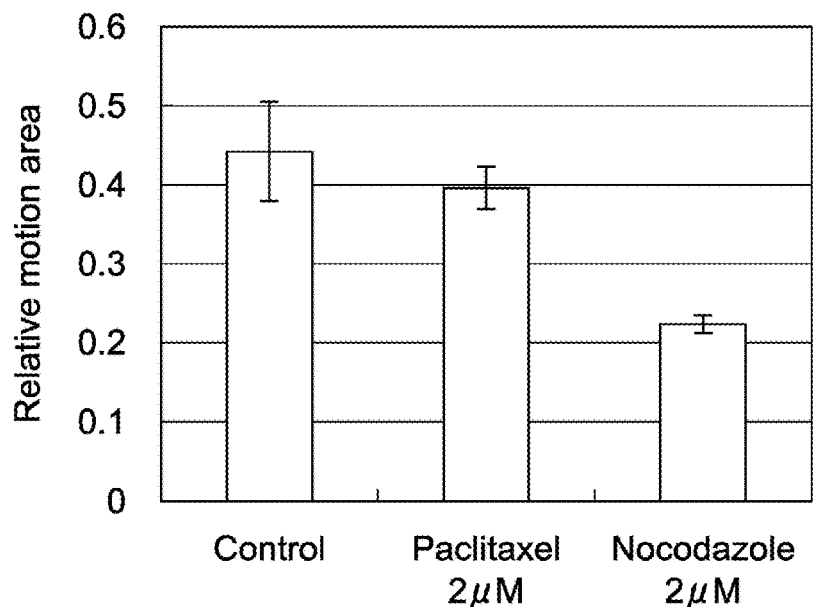
FIG. 25 is a graph of a relative motion area for cells cultured on three different conditions according to Example of the present technology.

FIG. 19 is a phase-contrast image of a comparative cell to which nothing is administered, and FIG. 20 is a color map of the comparative cell. FIG. 21 is a phase-contrast image of a cell to which Paclitaxel is administered, and FIG. 22 is a color map of the cell. FIG. 23 is a phase-contrast image of a cell to which Nocodazole is administered, and FIG. 24 is a color map of the cell. FIG. 25 is a graph of a relative motion area for the cells cultured on those three conditions. The cell to which Paclitaxel stabilizing a microtubule is administered and the comparative cell do not have difference in color map and in value of the relative motion area. However, in the cell to which Nocodazole destabilizing a microtubule is administered, it is found that the motion area obviously shrinks in the color map and the value of the relative motion area decreases.

Example 7: Change in Motion Speed by Metabolic Inhibition with Use of Mitochondrial Uncoupler Images (moving image) of U2OS cells cultured at different medicine concentrations were captured with a phase contrast microscope. A medicine was CCCP, which is a mitochondrial uncoupler used as a metabolic inhibitor. Three types of cells respectively having medicine concentrations of 0.5, 5, and 50 micro M and a comparative cell to which nothing is administered were prepared. The magnification power of the microscope was 20×, the imaging interval was 5 frames per second, and the imaging time was 20 minutes. After motion vectors were calculated at intervals of approximately 1 micrometer, a relative motion area was calculated to create a graph.

Figure 26:
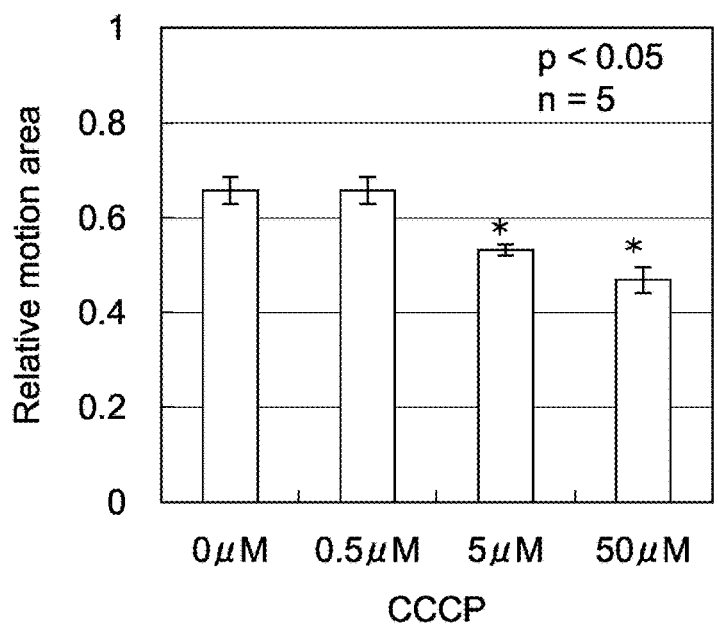
FIG. 26 is a graph of a relative motion area for cells to which CCCP is administered at different medicine concentrations and which are cultured, according to Example of the present technology.

FIG. 26 is a graph of a relative motion area for the cells cultured at different medicine concentrations. It is found that the value of the relative motion area decreases in accordance with an increase of the concentration of CCCP.

Example 8: Change in Motion Speed by Motor Protein Inhibitor

Images (moving image) of U2OS cells cultured at different medicine concentrations were captured with a phase contrast microscope. Medicines were AMP-PNP and ATA, the AMP-PNP being an ATP analog that competitively inhibits ATP, the ATA being a motor protein inhibitor. For the AMP-PNP, three types of cells respectively having medicine concentrations of 67, 200, and 670 micro M and a comparative cell to which nothing is administered were prepared. For the ATA, three types of cells respectively having medicine concentrations of 10, 30, and 100 micro M and a comparative cell to which nothing is administered were prepared. The magnification power of the microscope was 20×, the imaging interval was 5 frames per second, and the imaging time was 60 minutes. After motion vectors were calculated at intervals of approximately 1 micrometer, an average of the motion amount per unit time (motion speed) was calculated, to create a graph.

Figure 27:
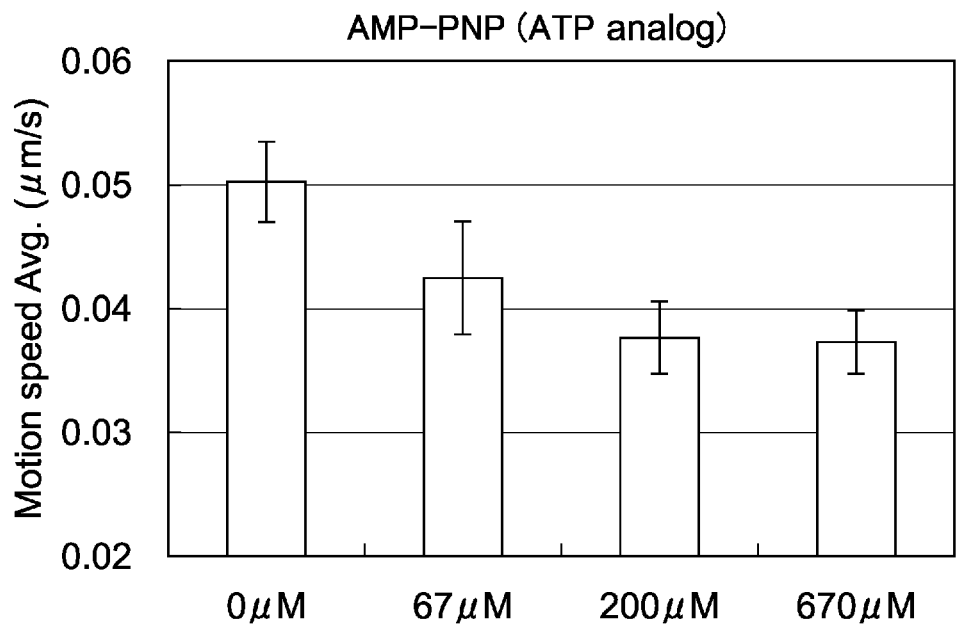
FIG. 27 is a graph of a motion speed for cells to which AMP-PNP is administered at different medicine concentrations and which are cultured, according to Example of the present technology.
Figure 28:
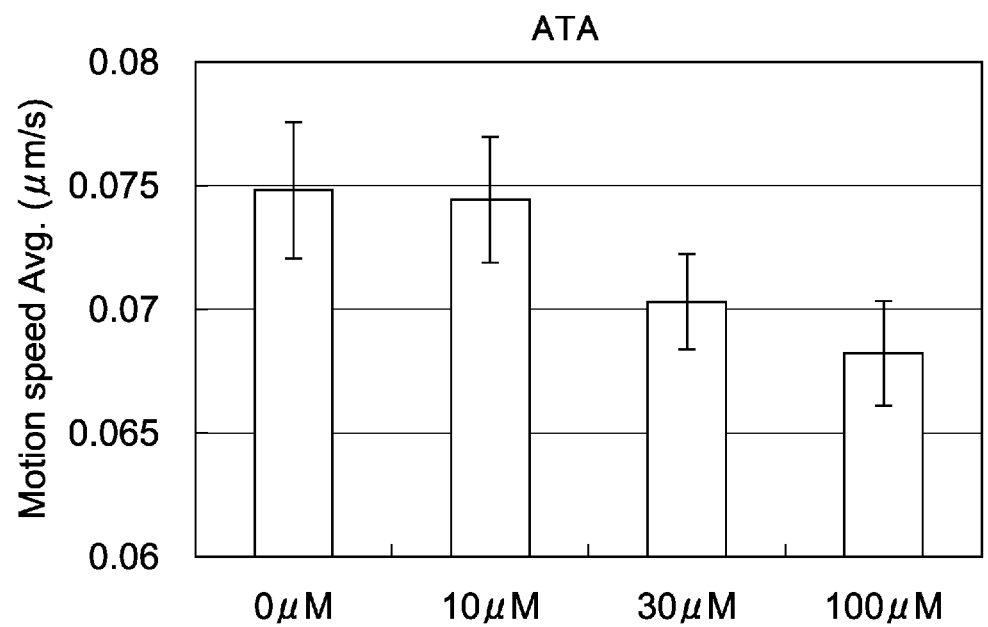
FIG. 28 is a graph of a motion speed for cells to which ATA is administered at different medicine concentrations and which are cultured, according to Example of the present technology.

FIG. 27 is a graph of a motion speed for the cells to which AMP-PNP is administered at different medicine concentrations. FIG. 28 is a graph of a motion speed for the cells to which ATA is administered at different medicine concentrations. From those graphs, it is found that the value of the motion speed decreases in accordance with an increase of the medicine concentration.

It should be noted that the present technology can have the following configurations.

(1) An image processing apparatus including:
circuitry configured to
receive at least two images of at least one cell, wherein the at least two images are captured at different times;
determine a motion amount of at least one intracellular structure identified within the at least one cell by comparing the at least two images; and
generate an indication of cell metabolism information associated with the at least one cell by relating at least one parameter of the motion amount to a degree of cell metabolism for the at least one cell based on reference information.

(2) The image processing apparatus of (1), wherein generating an indication of cell metabolism information associated with the at least one cell includes comparing the at least one parameter of the motion amount to reference motion information for a cell type of the at least one cell in the at least two images.

(3) The image processing apparatus of (1) or (2), wherein generating an indication of cell metabolism information associated with the at least one cell includes comparing the at least one parameter of the motion amount to a waveform relating the motion amount per unit time of a target cell.

(4) The image processing apparatus of (1) to (3), wherein generating an indication of cell metabolism information associated with the at least one cell includes generating an indication of the status of at least one cytoskeleton structure of the at least one cell.

(5) The image processing apparatus of (4), wherein generating an indication of the status of at least one cytoskeleton structure is based on determining a motion area of the at least one cell.

(6) The image processing apparatus of (1) to (5), wherein generating an indication of cell metabolism information associated with the at least one cell includes generating an indication of an estimated amount of adenosine triphosphate (ATP) produced by the at least one cell.

(7) The image processing apparatus of (1) to (6), wherein the at least one parameter of the motion amount includes one or more of an average value of the motion amount, a median value of the motion amount, a maximum value of the motion amount, and a standard deviation of the motion amount.

(8) The image processing apparatus of (1) to (7), wherein the at least one parameter of the motion amount includes a relative motion area identifying a proportion of a motion area to an area of the at least one cell.

(9) The image processing apparatus of (8), wherein the indication provides information identifying a degree of stabilization of microtubules based on the value of a relative motion area.

(10) The image processing apparatus of (1) to (9), wherein the at least one intracellular structure includes an endosome granule.

(11) The image processing apparatus of (10), wherein determining motion amount of the at least one intracellular structure includes determining motion amount of the endosome granule along a microtubule within the at least one cell.

(12) The image processing apparatus of (1) to (11), wherein generating an indication of cell metabolism information includes generating an indication of a cell cycle status of the at least one cell.

(13) The image processing apparatus of (12), wherein generating an indication of a cell cycle status of the at least one cell is based on determining information on motion speed of the at least one cell.

(14) The image processing apparatus of (12) or (13), wherein generating an indication of a cell cycle status of the at least one cell is based on determining information on a cell area of the at least one cell.

(15) The image processing apparatus of (14), wherein the indication of the cell cycle status includes information about whether the at least one cell is in either G2 phase, M phase or G1 phase.

(16) The image processing apparatus of (14) or (15), wherein generating an indication of a cell cycle status includes identifying that the at least one cell is either in G1 phase, M phase or G2 phase based on the motion speed of the at least one cell.

(17) The image processing apparatus of (16), wherein identifying that the at least one cell is in G1 phase, M phase or G2 phase based on whether the at least one cell decreases in motion speed over a period of time.

(18) The image processing apparatus of (1) to (17), wherein the reference information includes motion information for cells subjected to a treatment condition that alters the stability of microtubules.

(19) The image processing apparatus of (1) to (18), wherein the reference information includes motion information for cells subjected to a treatment condition to reduce cell metabolism.

(20) The image processing apparatus of (1) to (19), wherein the reference information includes motion information for cells subjected to a treatment condition to reduce motor protein activity.

(21) The image processing apparatus of (1) to (20), wherein the at least one intracellular structure is in a region of the at least two images separate from a region that includes the nucleus of the at least one cell.

(22) The image processing apparatus of (1) to (21), wherein determining the motion amount includes determining the motion amount at a resolution of less than a dimension of the at least one intracellular structure.

(23) The image processing apparatus of (1) to (21), wherein determining the motion amount includes determining a motion vector corresponding to the at least one intracellular structure by comparing the at least two images of the at least one cell.

(24) The image processing apparatus of (23), wherein determining the motion amount includes determining a length of the motion vector.

(25) The image processing apparatus of (23) or (24), wherein determining the motion amount includes determining a motion speed of the at least one intracellular structure based on the different times when the at least two images are captured.

(26) An image processing method including:
receiving at least two images of at least one cell, wherein the at least two images are captured at different times;
determining a motion amount of at least one intracellular structure identified within the at least one cell by comparing the at least two images; and
generating an indication of cell metabolism information associated with the at least one cell by relating at least one parameter of the motion amount to a degree of cell metabolism for the at least one cell based on reference information.

(27) At least one computer-readable storage medium storing computer-executable instructions that, when executed, perform an image processing method including:
receiving at least two images of at least one cell, wherein the at least two images are captured at different times;
determining a motion amount of at least one intracellular structure identified within the at least one cell by comparing the at least two images; and
generating an indication of cell metabolism information associated with the at least one cell by relating at least one parameter of the motion amount to a degree of cell metabolism for the at least one cell based on reference information.

(28) An image processing system including:
an image sensor configured to capture at least two images of a cell at different times;
circuitry configured to
receive the at least two images of at least one cell;
determine a motion amount of at least one intracellular structure identified within the at least one cell by comparing the at least two images; and generate an indication of cell metabolism information associated with the at least one cell by relating at least one parameter of the motion amount to a degree of cell metabolism for the at least one cell based on reference information; and at least one display configured to present, to a user, a visual representation of the indication of cell metabolism information.

(29) The image processing system of (28), wherein the visual representation includes an image where the cell metabolism information is superimposed on an image of the at least two images.

(30) The image processing system of (28) or (29), wherein the visual representation includes a graph plotting results of the motion information of the cell and results of motion information of a comparative cell.

(31) The image processing system of (28) to (30), wherein the visual representation includes a graph plotting temporal changes in average value of the motion amount per unit time.

(32) The image processing system of (28) to (31), wherein the visual representation includes a graph plotting temporal changes in cell area.

(33) An information processing apparatus, including
an analysis unit configured to calculate a motion amount per unit time from an image of a cell and specify information on a cell cycle of the cell on the basis of the motion amount per unit time.

(34) The information processing apparatus according to (33), in which
the analysis unit is configured to extract a motion vector from the image and calculate the motion amount per unit time from the motion vector.

(35) The information processing apparatus according to (33) or (34), further including
a display control unit configured to make the information on a cell cycle visible.

(36) The information processing apparatus according to (35), in which
the display control unit is configured to generate an image in which the information on a cell cycle is superimposed on the image of the cell.

(37) The information processing apparatus according to (35) or (36), in which
the display control unit is further configured to make the motion amount per unit time visible.

(38) The information processing apparatus according to any one of (33) to (37), in which
the analysis unit is configured to specify one of a position of a cell cycle and a length of the cell cycle as the information on a cell cycle.

(39) The information processing apparatus according to any one of (33) to (38), in which
the analysis unit is configured to calculate one of an average value and a median value of the motion amount per unit time and specify the information on a cell cycle on the basis of one of the average value and the median value.

(40) The information processing apparatus according to any one of (33) to (39), in which
the analysis unit is configured to specify the information on a cell cycle on the basis of the motion amount per unit time that is calculated from a range designated by a user on the image.

(41) The information processing apparatus according to any one of (33) to (39), in which
the analysis unit is configured to specify the information on a cell cycle on the basis of a result of image recognition processing on the image and the motion amount per unit time.

(42) The information processing apparatus according to (41), in which
the analysis unit is configured to specify a range of at least one cell from the image and specify the information on a cell cycle on the basis of the motion amount per unit time that is calculated from an area corresponding to the range of the at least one cell in the image.

(43) The information processing apparatus according to (41), in which
the analysis unit is configured to specify a range of an intracellular structure of at least one cell from the image and specify the information on a cell cycle on the basis of the motion amount per unit time that is calculated from an area corresponding to the range of the intracellular structure in the image.

(44) The information processing apparatus according to any one of (33) to (43), further including
an imaging control unit configured to control an imaging apparatus such that an imaging interval of an image for which the motion amount per unit time is calculated is one second or less.

(45) The information processing apparatus according to any one of (33) to (44), in which
the cell includes one of a single dividing cell and a dividing cell group.

(46) The information processing apparatus according to any one of (33) to (45), in which
the cell includes one of a cancer cell and a stem cell.

(47) An information processing system, including:
an imaging apparatus; and
an information processing apparatus including
an imaging control unit configured to control the imaging apparatus to capture an image of a cell, and
an analysis unit configured to calculate a motion amount per unit time from the image of the cell, the image being captured by the imaging apparatus, and specify information on a cell cycle of the cell on the basis of the motion amount per unit time.

(48) The information processing system according to (47), in which
the imaging control unit is configured to control the imaging apparatus such that an image for which the motion amount per unit time is calculated is captured at an imaging interval of one second or less.

(49) An information processing method, including:
calculating, by an analysis unit, a motion amount per unit time from an image of a cell; and
specifying information on a cell cycle of the cell on the basis of the motion amount per unit time.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 1 information processing system
11 imaging apparatus
12 information processing apparatus
121 imaging control unit 122 image acquisition unit
123 analysis unit
124 display control unit

The invention claimed is:

1. An image processing apparatus comprising:
circuitry configured to:
receive at least two images of at least one cell, wherein the at least two images are captured at different times;
determine a motion amount of at least one intracellular structure identified within the at least one cell by comparing the at least two images, wherein determining the motion amount includes determining a motion vector corresponding to the at least one intracellular structure by comparing the at least two images of the at least one cell and determining a length of the motion vector; and
generate an indication of cell metabolism information associated with the at least one cell by relating at least one parameter of the motion amount to a degree of cell metabolism for the at least one cell based on reference information.

2. The image processing apparatus of claim 1, wherein generating an indication of cell metabolism information associated with the at least one cell includes comparing the at least one parameter of the motion amount to reference motion information for a cell type of the at least one cell in the at least two images.

3. The image processing apparatus of claim 1, wherein generating an indication of cell metabolism information associated with the at least one cell includes comparing the at least one parameter of the motion amount to a waveform relating the motion amount per unit time of a target cell.

4. The image processing apparatus of claim 1, wherein generating an indication of cell metabolism information associated with the at least one cell includes generating an indication of status of at least one cytoskeleton structure of the at least one cell.

5. The image processing apparatus of claim 4, wherein generating an indication of the status of at least one cytoskeleton structure is based on determining a motion area of the at least one cell.

6. The image processing apparatus of claim 1, wherein generating an indication of cell metabolism information associated with the at least one cell includes generating an indication of an estimated amount of adenosine triphosphate (ATP) produced by the at least one cell.

7. The image processing apparatus of claim 1, wherein the at least one parameter of the motion amount includes one or more of an average value of the motion amount, a median value of the motion amount, a maximum value of the motion amount, and a standard deviation of the motion amount.

8. The image processing apparatus of claim 1, wherein the at least one parameter of the motion amount includes a relative motion area identifying a proportion of a motion area to an area of the at least one cell.

9. The image processing apparatus of claim 8, wherein the indication provides information identifying a degree of stabilization of microtubules based on a value of the relative motion area.

10. The image processing apparatus of claim 1, wherein the at least one intracellular structure includes an endosome granule.

11. The image processing apparatus of claim 10, wherein determining motion amount of the at least one intracellular structure includes determining motion amount of the endosome granule along a microtubule within the at least one cell.

12. The image processing apparatus of claim 1, wherein generating an indication of cell metabolism information includes generating an indication of a cell cycle status of the at least one cell.

13. The image processing apparatus of claim 12, wherein generating an indication of a cell cycle status of the at least one cell is based on determining information on motion speed of the at least one cell.

14. The image processing apparatus of claim 12, wherein generating an indication of a cell cycle status of the at least one cell is based on determining information on a cell area of the at least one cell.

15. The image processing apparatus of claim 14, wherein the indication of the cell cycle status includes information about whether the at least one cell is in either G2 phase, M phase or G1 phase.

16. The image processing apparatus of claim 14, wherein generating an indication of a cell cycle status includes identifying that the at least one cell is either in G1 phase, M phase or G2 phase based on motion speed of the at least one cell.

17. The image processing apparatus of claim 16, wherein identifying that the at least one cell is in G1 phase, M phase or G2 phase based on whether the at least one cell decreases in motion speed over a period of time.

18. The image processing apparatus of claim 1, wherein the reference information includes motion information for cells subjected to a treatment condition that alters stability of microtubules.

19. The image processing apparatus of claim 1, wherein the reference information includes motion information for cells subjected to a treatment condition to reduce cell metabolism.

20. The image processing apparatus of claim 1, wherein the reference information includes motion information for cells subjected to a treatment condition to reduce motor protein activity.

21. The image processing apparatus of claim 1, wherein the at least one intracellular structure is in a region of the at least two images separate from a region that includes a nucleus of the at least one cell.

22. The image processing apparatus of claim 1, wherein determining the motion amount includes determining the motion amount at a resolution of less than a dimension of the at least one intracellular structure.

23. The image processing apparatus of claim 1, wherein determining the motion amount includes determining a motion speed of the at least one intracellular structure based on the different times when the at least two images are captured.

24. An image processing method comprising:
receiving at least two images of at least one cell, wherein the at least two images are captured at different times;
determining a motion amount of at least one intracellular structure identified within the at least one cell by comparing the at least two images, wherein determining the motion amount includes determining a motion vector corresponding to the at least one intracellular structure by comparing the at least two images of the at least one cell and determining a length of the motion vector; and
generating an indication of cell metabolism information associated with the at least one cell by relating at least one parameter of the motion amount to a degree of cell metabolism for the at least one cell based on reference information.

25. At least one non-transitory computer-readable storage medium storing computer-executable instructions that, when executed, perform an image processing method comprising:
receiving at least two images of at least one cell, wherein the at least two images are captured at different times;
determining a motion amount of at least one intracellular structure identified within the at least one cell by comparing the at least two images, wherein determining the motion amount includes determining a motion vector corresponding to the at least one intracellular structure by comparing the at least two images of the at least one cell and determining a motion speed of the at least one intracellular structure based on the different times when the at least two images are captured; and
generating an indication of cell metabolism information associated with the at least one cell by relating at least one parameter of the motion amount to a degree of cell metabolism for the at least one cell based on reference information.

26. An image processing system comprising:
an image sensor configured to capture at least two images of at least one cell at different times;
circuitry configured to:
receive the at least two images of the at least one cell;
determine a motion amount of at least one intracellular structure identified within the at least one cell by comparing the at least two images; and
generate an indication of cell metabolism information associated with the at least one cell by relating at least one parameter of the motion amount to a degree of cell metabolism for the at least one cell based on reference information; and
at least one display configured to present, to a user, a visual representation of the indication of cell metabolism information, wherein the visual representation includes an image where the cell metabolism information is superimposed on an image of the at least two images.

27. The image processing system of claim 26, wherein the visual representation includes a graph plotting results of motion information of the at least one cell and results of motion information of a comparative cell.

28. The image processing system of claim 26, wherein the visual representation includes a graph plotting temporal changes in average value of the motion amount per unit time.

29. The image processing system of claim 26, wherein the visual representation includes a graph plotting temporal changes in cell area.

30. An image processing system comprising:
an image sensor configured to capture at least two images of at least one cell at different times;
circuitry configured to:
receive the at least two images of the at least one cell;
determine a motion amount of at least one intracellular structure identified within the at least one cell by comparing the at least two images; and
generate an indication of cell metabolism information associated with the at least one cell by relating at least one parameter of the motion amount to a degree of cell metabolism for the at least one cell based on reference information; and
at least one display configured to present, to a user, a visual representation of the indication of cell metabolism information, wherein the visual representation includes a graph plotting results of motion information of the at least one cell and results of motion information of a comparative cell.

31. An image processing system comprising:
an image sensor configured to capture at least two images of at least one cell at different times;
circuitry configured to
receive the at least two images of the at least one cell;
determine a motion amount of at least one intracellular structure identified within the at least one cell by comparing the at least two images; and
generate an indication of cell metabolism information associated with the at least one cell by relating at least one parameter of the motion amount to a degree of cell metabolism for the at least one cell based on reference information; and
at least one display configured to present, to a user, a visual representation of the indication of cell metabolism information, wherein the visual representation includes a graph plotting temporal changes in average value of the motion amount per unit time.

* * * * *